UNITED STATES PATENT OFFICE.

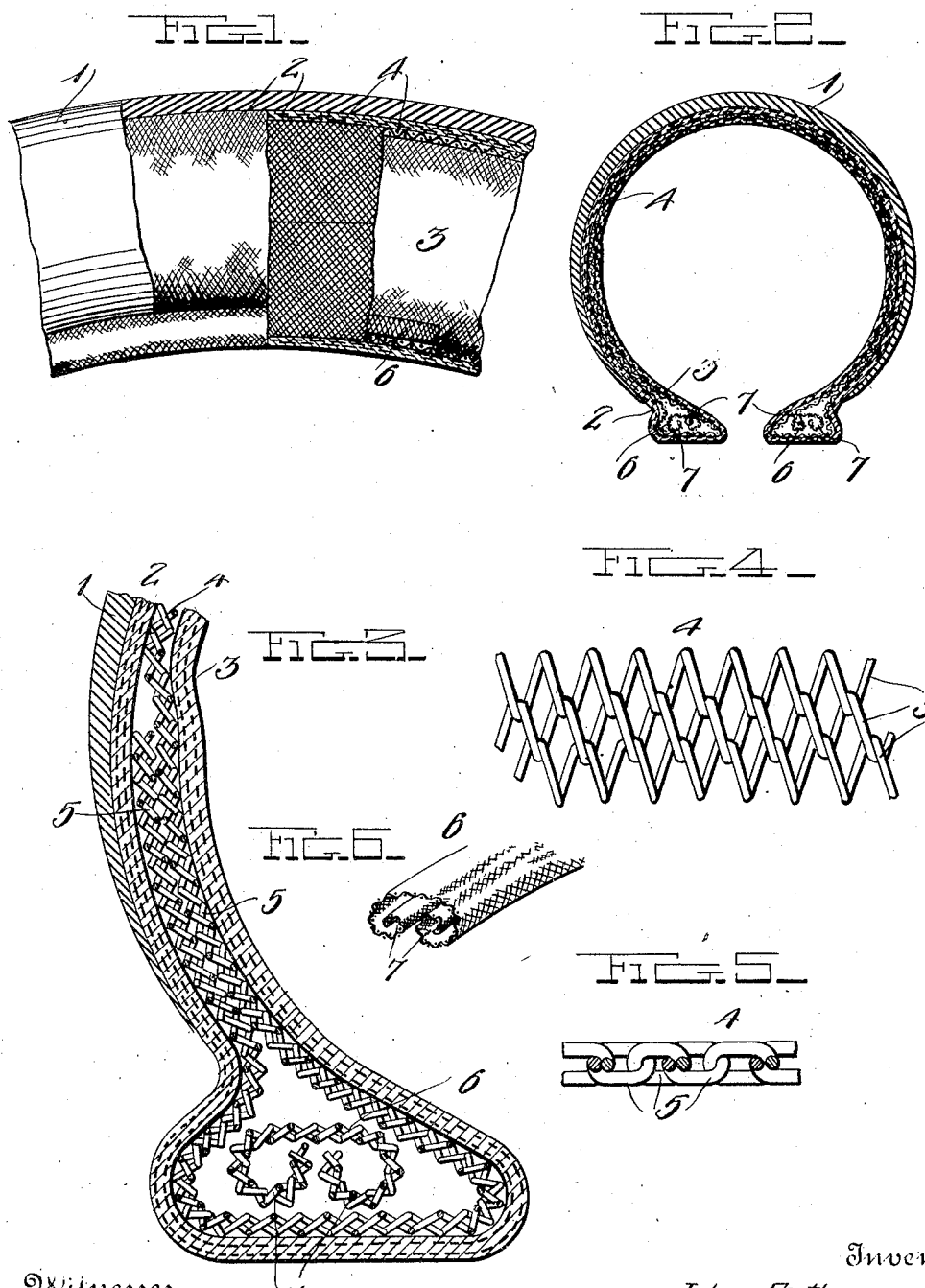

JOHN ANTHONY, OF ATTLEBORO, MASSACHUSETTS.

REINFORCED PUNCTURE-PROOF TIRE.

1,003,314.  Specification of Letters Patent.  Patented Sept. 12, 1911.

Application filed April 27, 1911. Serial No. 623,638.

*To all whom it may concern:*

Be it known that I, JOHN ANTHONY, a citizen of the United States, residing at Attleboro, in the county of Bristol and State of Massachusetts, have invented certain new and useful Improvements in Reinforced Puncture-Proof Tires; and I do declare the following to be a full, clear, and exact description of the invention, such as will enable others skilled in the art to which it appertains to make and use the same.

This invention relates to improvements in tires.

One object of the invention is to provide a tire having arranged therein a puncture proof reinforcement by means of which the tire will be effectually protected at the points where the greatest strain occurs.

Another object is to provide a reinforcement of this character which will be strong and durable in construction, efficient and reliable in operation and which will not interfere with the elasticity or the yielding action of the tire.

With these and other objects in view, the invention consists of certain novel features of construction, combination and arrangement of parts as will be more fully described and particularly pointed out in the appending claim.

In the accompanying drawings: Figure 1 is a side view of a portion of my improved tire with parts broken away and in section; Fig. 2 is a cross sectional view of the same; Fig. 3 is a cross sectional view on an enlarged scale of a portion of one side of the tire showing more clearly the construction and arrangement of the reinforcements therein and the construction and arrangement of the filling or binding strip for this side of the tire; Fig. 4 is an enlarged plan view of a portion of the woven wire reinforcing fabric showing more clearly the construction and arrangement of the coils of the fabric; Fig. 5 is a detail cross sectional view of the same; Fig. 6 is a detail perspective view of a portion of one of the binding and filling strips employed in connection with the reinforcement for holding the folded or double edges of the same and the adjacent portions of the tire in shape to receive the flanges of clencher rims.

In the embodiment of the invention shown in the accompanying drawing, 1 denotes the outer covering or layer of the tire, said covering or layer 1 being preferably formed of rubber. Firmly secured to the inner side of the rubber covering or layer 1 is an outer lining 2 of canvas or other similar woven material. The outer lining 2 is connected at its inner edges to an inner lining 3 formed of canvas or material similar to the outer lining 2.

Between the outer and inner linings 2 and 3 is arranged an improved puncture proof reinforcement 4, said reinforcement comprising a strip or sheet of flexible woven wire fabric, the wires of which are formed in elongated or flattened coils 5 interwoven together in such manner as to permit the fabric to freely stretch lengthwise of the tire and thus readily yield or give to the movement of the latter when pressure is applied thereto.

The woven wire reinforcing sheet or strip 4 is folded outwardly upon itself at the inner edges of the tire and the folded edges of the strip or sheet extended upwardly in engagement with the outer sides of the main portion of the sheet thereby providing a double construction for the inner portion or sides of the tire. As is well known the greatest strain is applied to the inner portions of the sides of a pneumatic tire, and it is at this point that most blow-outs occur. By doubling my improved reinforcement as herein shown and described the sides of the tire are greatly strengthened and enabled to effectually resist the strain or pressure applied thereto.

When the tire is to be employed in connection with clencher rims, the inner folded or doubled edges of the reinforcement are bent to conform to the shape of the clenching flanges of the rim and said folded or doubled edges and the portions of the tire covering the same are supported or held in shape to receive the clenching flanges of the rim by means of filling or binding members 6, said members being constructed in the form of woven wire strips having their edges bent inwardly in the form of coils 7 whereby said binding or filling members are given a substantially elliptical shaped form in cross section and will be flexible and will readily conform to the circular shape of the tire and will approximately fill the spaces formed by the folded and bent inner edges of the reinforcement and will support said folded or bent ends and the adjacent portions of the tire to receive the clenching flanges of the rim whereby the tire will be effectually secured thereto.

While my improved reinforcement is herein shown and described as being arranged between the inner and outer linings of the tire it is obvious that the reinforcement may be otherwise arranged as for instance, between the outer lining and the outer rubber covering or embedded in said outer rubber covering or said reinforcement may be arranged between the inner lining and the inner tube of the tire.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

In a tire a flexible reinforcing strip having its inner edges folded outwardly upon the outer sides of the strip and bent to form longitudinal passages, binding members adapted to be engaged with said passages, said members being formed from woven wire strips having their edges bent inwardly, in the form of coils whereby a substantially elliptically shaped flexible body is provided for said binding members.

In testimony whereof I have hereunto set my hand in presence of two subscribing witnesses.

JOHN ANTHONY.

Witnesses:
   JAMES L. WIGGMORE,
   ELIZABETH DOCKRY.